(12) United States Patent
Polk, Jr.

(10) Patent No.: US 6,719,551 B2
(45) Date of Patent: Apr. 13, 2004

(54) THERMOPLASTIC MOLDING PROCESS AND APPARATUS

(76) Inventor: Dale E. Polk, Jr., 7483 Windover Way, Titusville, FL (US) 32780

( * ) Notice: Subject to any disclaimer, the term of this patent is extended or adjusted under 35 U.S.C. 154(b) by 0 days.

(21) Appl. No.: 10/104,394

(22) Filed: Mar. 25, 2002

(65) Prior Publication Data

US 2002/0098256 A1 Jul. 25, 2002

Related U.S. Application Data

(62) Division of application No. 08/993,516, filed on Dec. 18, 1997, now abandoned.

(51) Int. Cl.[7] ................... B29C 47/16; B29C 43/04
(52) U.S. Cl. ............... 425/126.1; 425/163; 425/253; 425/259; 425/261; 425/297; 425/377
(58) Field of Search ................ 425/259, 261, 425/466, 126.1, 162, 163, 253, 377, 297

(56) References Cited

U.S. PATENT DOCUMENTS

| | | | |
|---|---|---|---|
| 3,224,043 A | 12/1965 | Lameris et al. ............ | 18/30 |
| 3,302,243 A | 2/1967 | Ludwig ................... | 18/30 |
| 3,695,799 A | 10/1972 | Held, Jr. .................. | 425/109 |
| 3,789,095 A | 1/1974 | Winstead .................. | 264/51 |
| 3,868,209 A | 2/1975 | Howell .................... | 425/504 |
| 3,915,608 A | 10/1975 | Hujik ..................... | 425/119 |
| 3,933,417 A | 1/1976 | Reilly et al. ............. | 425/326 |
| 4,304,622 A | 12/1981 | Krumm .................... | 156/500 |
| 4,413,964 A | 11/1983 | Winstead .................. | 425/66 |
| 4,420,300 A | 12/1983 | Winstead .................. | 425/142 |
| 4,421,712 A | 12/1983 | Winstead .................. | 264/551 |
| 4,470,790 A | 9/1984 | Harada et al. ............. | 264/177.16 |
| 4,517,145 A | 5/1985 | Knopf ..................... | 264/40.2 |
| 4,594,063 A | 6/1986 | Reifenhauser et al. ....... | 264/40.1 |
| 4,698,001 A | 10/1987 | Vismara ................... | 425/4 R |
| 4,776,782 A | 10/1988 | Murayama et al. .......... | 264/297.6 |
| 5,507,999 A | 4/1994 | Copsey et al. ............ | 264/545 |
| 5,330,342 A | 7/1994 | Linss et al. .............. | 425/150 |
| 5,500,170 A | 3/1996 | Okumura et al. ........... | 425/466 |
| 5,551,860 A | 9/1996 | Budzynski et al. ......... | 425/504 |
| 5,614,276 A | * 3/1997 | Petsetakis ................ | 428/36.9 |

* cited by examiner

Primary Examiner—Robert Davis
Assistant Examiner—Joseph S Del Sole
(74) Attorney, Agent, or Firm—William M. Hobby, III

(57) ABSTRACT

A thermoplastic molding process uses the thermoplastic molding apparatus to mold a part of variable thickness from a slab of material heated during extrusion. The thermoplastic molding system includes a thermoplastic extrusion die for the extrusion of a thermoplastic slab. The extrusion die has adjustable die gate members for varying the thickness of the extruded material in different parts of the extruded slab. A plurality of molds are mounted to the platform to feed one mold into a loading position while a second mold is in a release position.

3 Claims, 3 Drawing Sheets

THERMOPLASTIC MOLDING PROCESS AND APPARATUS

This is a division of patent application Ser. No. 08/993,516, filed Dec. 18, 1997 for a "Thermoplastic Molding Process and Apparatus", now abandoned. The present invention relates to a thermoplastic molding process and apparatus and especially to a thermoplastic process and apparatus using a thermoplastic extrusion die having adjustable gates for varying the thickness of the extruded material, which material is molded as it is passed from the extrusion die.

BACKGROUND OF THE INVENTION

The present invention relates to a thermoplastic molding process and apparatus and especially to a thermoplastic process and apparatus using a thermoplastic extrusion die having adjustable gates for varying the thickness of the extruded material, which material is molded as it is passed from the extrusion die.

In the past it has been common to provide a wide variety of molding systems including the molding of a thermoplastic resin or a thermoplastic composite part. In vacuum molding, a slab of heated thermoplastic material is placed on the vacuum mold and a vacuum drawn between the mold and the heated plastic material to draw the plastic material onto the mold. Similarly, a compression molded part feeds a heated slab of thermoplastic material, such as a sheet of material, between two molding forms which compresses the material in the mold.

The present invention is directed towards a molding system for producing a thermoplastic resin of thermoplastic composite parts using either a vacuum or compression mold with parts being fed directly to the molds from an extrusion die while the thermoplastic slab still retains the heat used in heating the resins to a fluid state for forming the sheets of material through the extrusion die.

Prior U.S. Pat. Nos which use thermoforming of material can be seen in the four Winstead patents, Nos. 4,420,300; 4,421,712; 4,413,964; and 3,789,095. The Winstead '712 and '300 patents are for an apparatus for continuous thermoforming of sheet material including an extruder along with stretching means and a wheel having a female mold thereon and a plurality of plug-assist means interlinked so as to form an orbiting device having a plug-assist member engaging the sheet material about a substantial arc of wheel surface. The Winstead '964 patent teaches an apparatus for continuously extruding and forming molded products from a web of thermoplastic material while continuously separating the product from the web, stacking and handling the products, and recycling the web selvage for further extrusion. The apparatus uses multiple mold cavities in a rotating polygon configuration over a peripheral surface of which the biaxially oriented web is continuously positioned by a follower roller interfacing the polygon with a biaxial orientation device. The Winstead U.S. Pat. No. 3,789,095 is an integrated method of continuously extruding low density form thermoplastic material and manufacturing three-dimensional formed articles therefrom.

The Howell U.S. Pat. No. 3,868,209, is a twin sheet thermoformer for fabricating a hollow plastic object from a pair of heat-fusible thermoplastic sheets which are serially moved in a common horizonal plane from a heating station to a mold mechanism at a forming station. The Held, Jr. U.S. Pat. No. 3,695,799, is an apparatus for vacuum forming hollow articles from two sheets of thermoplastic material by passing the sheets of material through a heating zone while in a spaced relationship and between two mold halves. The mold halves are brought together as a vacuum is pulled on each sheet to cause it to conform to the shape of its respective mold so as to mold a hollow article. The Budzynski et al., U.S. Pat. No. 5,551,860, is a blow molding apparatus for making bottles which have rotating molds continuously rotating while aligning one mold at a time with an extrusion die handle for loading the mold. The Hujik U.S. Pat. No. 3,915,608, is an injection molding machine for multi-layered shoe soles which includes a turntable for rotating a plurality of molds through a plurality of work stations for continuously molding shoe soles. The Ludwig U.S. Pat. No. 3,302,243, is another apparatus for injection molding of plastic shoes. The Lameris et al. U.S. Pat. No. 3,224,043, teaches an injection molding machine having at least two molds which can be rotated for alignment with plastic injecting nozzles. The Vismara U.S. Pat. No. 4,698,001, is a machine for manufacturing molded plastic motorcycle helmets and which uses a compression type mold in which a pair of mold halves is shifted between positions. The Krumm U.S. Pat. No. 4,304,622, is an apparatus for producing thick slabs of thermoplastic synthetic resins which includes a pair of extruders, each extruding a half slab strand to a respective roller assembly. The roller assemblies have final rollers which form a consolidation nip between them in which the two half slabs are bonded together.

The present invention is directed towards a continual thermoforming system which is fed slabs of thermoplastic material directly from an extruder forming the slabs of material onto a mold which can be rotated between stations. The thermoplastic material is extruded through an extrusion die which is adjustable for providing deviations from a constant thickness plastic slab to a variable thickness across the surface of the plastic slab. The variable thickness can be adjusted for any particular molding run or can be continuously varied as desired. This allows for continuous molding of thermoplastic material having different thicknesses across the extruded slab and through the molded part to control the interim part thickness of the molded part so that the molded part can have thick or thin spots as desired throughout the molded part.

SUMMARY OF THE INVENTION

A thermoplastic molding system includes a thermoplastic extrusion die for the extrusion of a thermoplastic slab. The extrusion die has adjustable die gate members for varying the thickness of the extruded material in different parts of the extruded slab. The thermoplastic extrusion die has a trimmer for cutting the extruded thermoplastic slab from the thermoplastic extrusion die. A plurality of thermoplastic molds, which may be either vacuum or compression molds, are each mounted on a movable platform, such as a rotating platform, for moving one mold at a time into a position to receive a thermoplastic slab being trimmed from the thermoplastic extrusion die. A molded part is formed with a variable thickness from a heated slab of thermoplastic material being fed still heated from the extrusion die. A plurality of molds are mounted to a platform to feed one mold into a loading position for receiving a thermoplastic slab from the extrusion die and a second mold into a release position for removing the formed part from the mold. The platform may be a shuttle or a rotating platform and allows each molded part to be cooled while another molded part is receiving a thermoplastic slab. A thermoplastic molding process is provided having the steps of selecting a thermoplastic extrusion die in accordance with the apparatus adjusting the thermoplastic extrusion die for varying the thickness of the extruded material passing therethrough in different parts of the extruded slab. The thermoplastic material is heated to a fluid state and extruded through the selected thermoplastic die which has been adjusted for varying the thickness of the extruded material in different parts of the extruded slab, trimming the extruded thermoplastic slab having a variable thickness to a predetermined size, and directing each trim slab of heated thermoplastic material onto a thermoforming mold, and molding a predetermined part in the mold so that the molded part is formed with a variable thickness from a slab of material heated during extrusion of the material.

BRIEF DESCRIPTION OF THE DRAWINGS

Other objects, features, and advantages of the present invention will be apparent from the written description and the drawings in which.

DESCRIPTION OF THE PREFERRED EMBODIMENT

Figure 1:
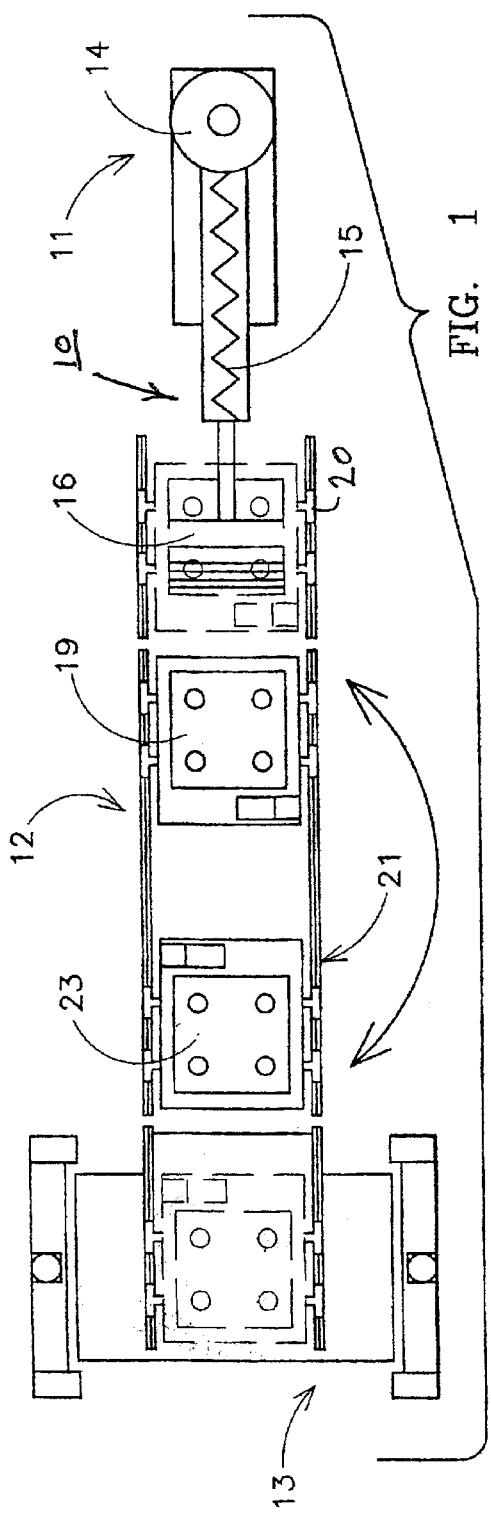
FIG. 1 is a top plan view of a molding system in accordance with the present invention.
Figure 2:
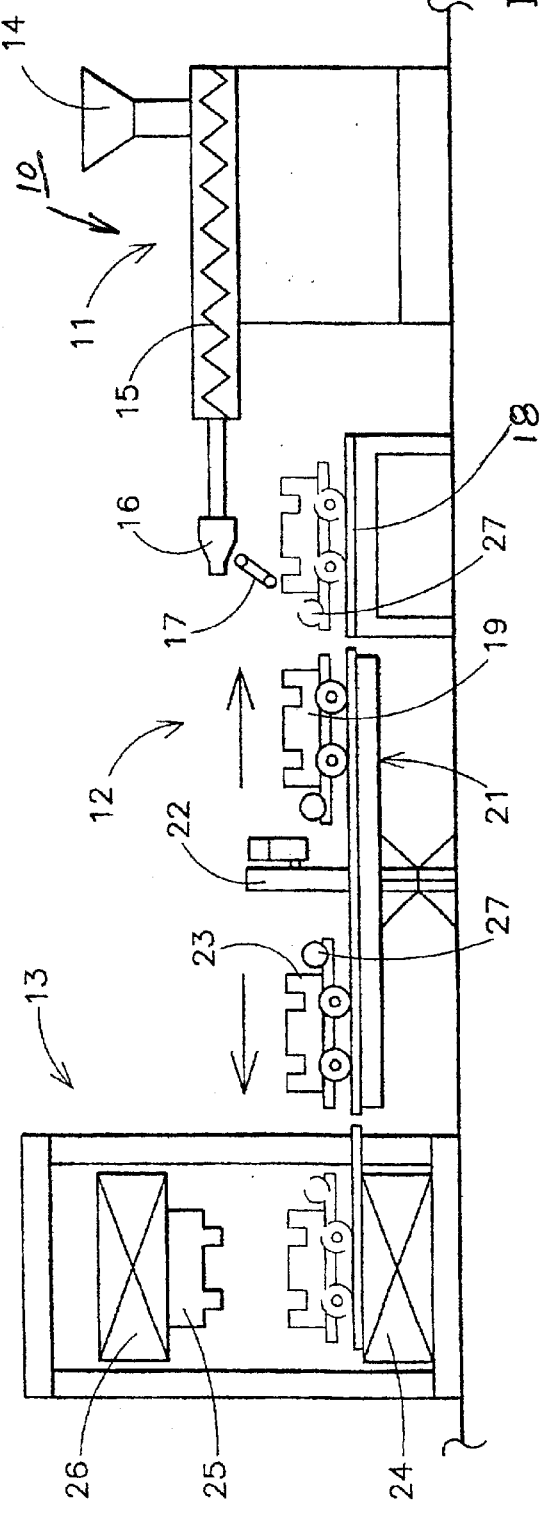
FIG. 2 is a side elevation view of the molding apparatus of FIG. 1.

Referring to FIGS. 1 and 2 of the drawings, a thermoforming apparatus 10 for thermoforming parts from a thermoplastic resin or from a thermoplastic composite is illustrated having an extruder 11, a mold exchange station 12, and a compression mold station 13. The extruder has a hopper 14 mounted on top for feeding a thermoplastic resin or composite material into an auger 15 where heaters are heating the thermoplastic material to a fluid material while the auger is feeding it along the length of the extruder path to an extrusion die 16 at the end thereof. The material being fed through the extruder and out the extrusion die is cut with a trimmer 17 mounted at the end of the die. The material is extruded in a generally flat plate slab and is trimmed at predetermined points by the trimmer 17 at it leaves the extrusion die. A support platform 18 will support a traveling mold half 19 directly under the extrusion die for receiving a slab of thermoplastic material. The traveling mold half has wheels 20 which allow the mold half to be moved from the platform 18 onto a rotating platform 21 mounted on a central rotating shaft 22. The rotating platform 21 will have a second mold half 23 thereon which can be fed into the compression molding station 13 while the mold half 19 is on the platform 18. The mold half 23 can be supported on a stationary platform 24 in the compression station directly beneath a common posing fixed mold half 25 mounted to a moving platen 26 where the molding operation takes place. Thus, the mold halves 19 and 23 can shuttle back and forth so that one mold can be capturing a thermoplastic slab while the other mold half is molding a part. Each of the traveling mold halves has an electric motor 27 for driving the mold half from the rotating platform 21 onto the platform 18 or onto the stationary platen 24. A linear transducer 28 can be mounted on the platform 18 for controlling the traveling mold halves speed.

It should be noted at this point that the extruder 11 produces the heated extruded slab still containing the heat energy onto the traveling mold half where it is delivered to the compression mold 13 and molded into a part without having to reheat a sheet of thermoplastic material. As will also be noted hereinafter in connection with FIGS. 4 and 5, the thermoplastic slab can also be of variable thickness throughout its width to enhance the thermoformed part made from the mold.

Figure 3A:
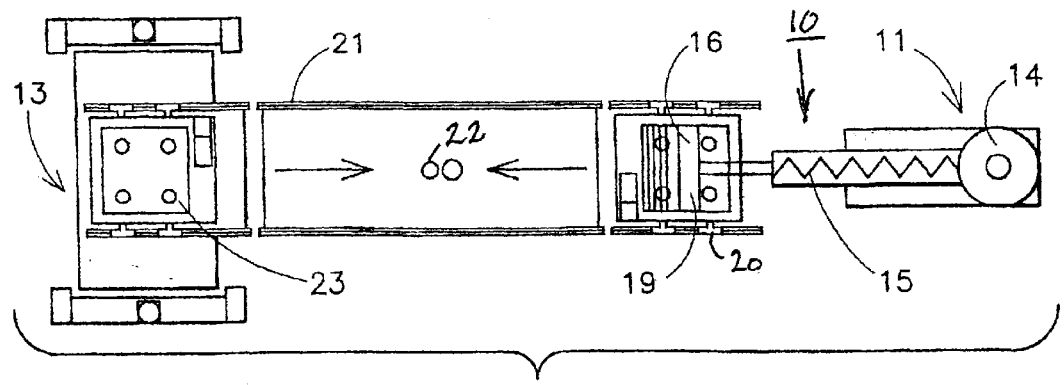
FIGS. 3A–3E are plan views of the mold of FIGS. 1 and 2 in different steps of the process of the present invention.
Figure 3B:
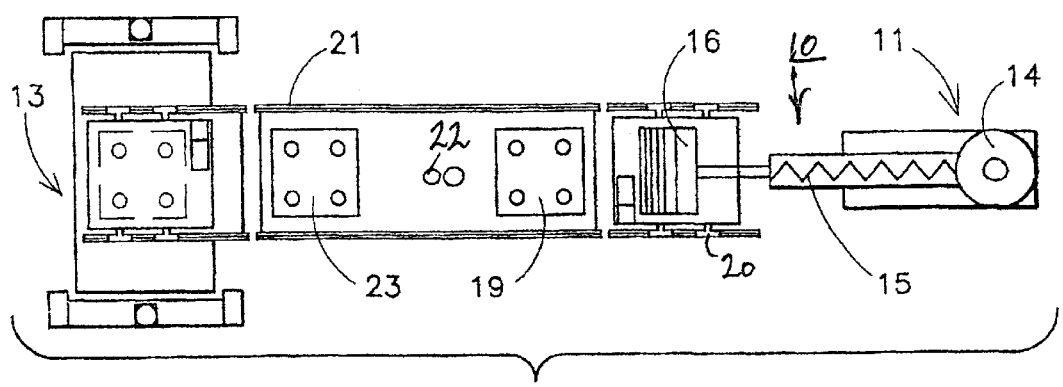
Figure 3C:
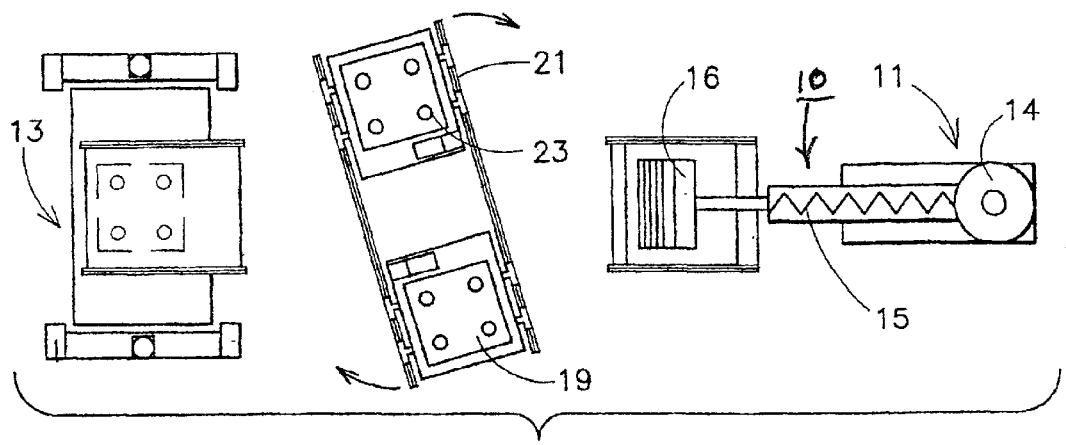
Figure 3D:
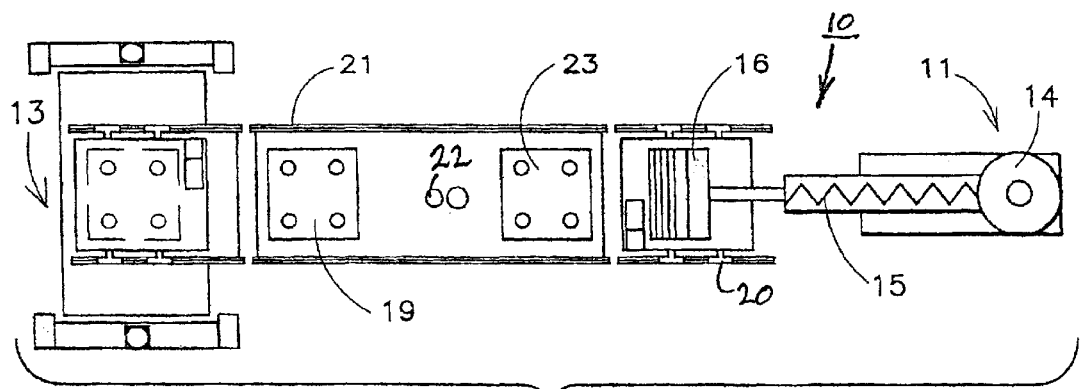
Figure 3E:
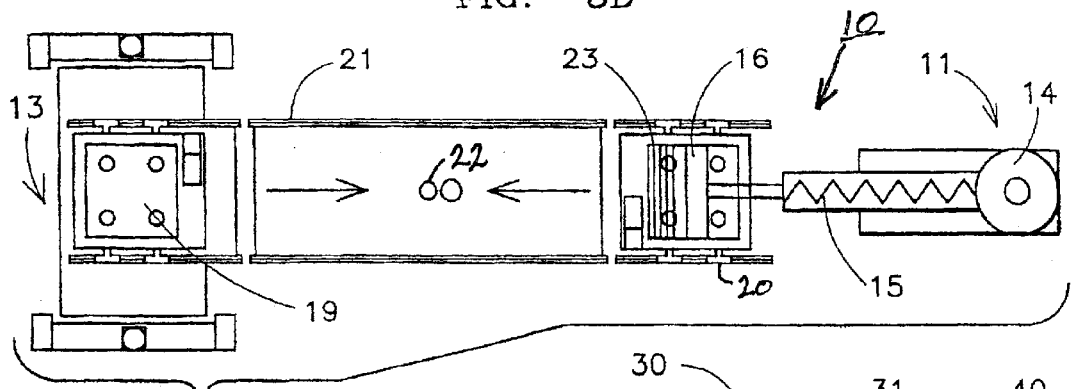

Turning to FIGS. 3A–3E, the thermoplastic molding apparatus 10 is illustrated having the mold halves 19 and 23 (marked A & B) in a series of positions in the operation of the press in accordance with the present invention. Each figure has the extruder 11 having the hopper 14 feeding the thermoplastic resin or composite material into an auger 15 where it is heated before being extruded. In FIG. 3A, mold A is empty and mold B is being charged with a hot melt directly from the extruder 10. In FIG. 3C, the mold carrier moves the mold halves A and B on the rotating turntable 21. In FIG. 3, the rotating turntable 21 rotates on the central axis shaft 22 between stations for loading a slab onto one mold and a loaded mold into the compression or vacuum molding machine 13. In FIG. 3D, the mold B travels into the press 13 while the empty mold A travels under the extrusion die for loading with a slab of thermoplastic material. In FIG. 3E, the mold B is press cooled and the part is ejected while mold A is charged with a hot melt as it is moved by its carrier below the extrusion die until completely charged.

Figure 4:
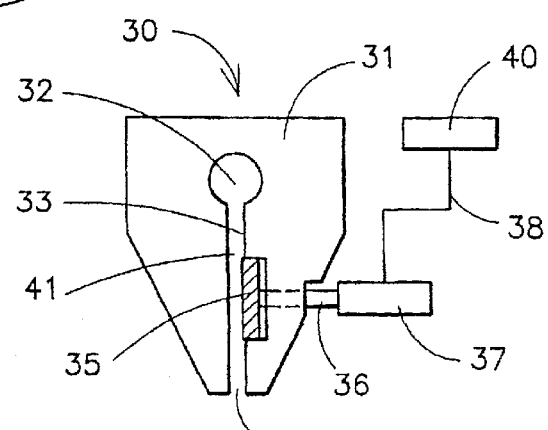
FIG. 4 is a side elevation of the extruder of FIGS. 1 and 2.
Figure 5:
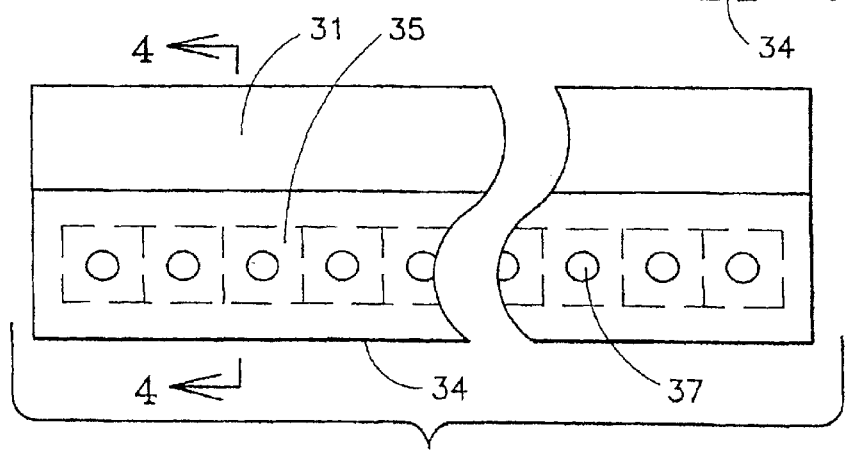
FIG. 5 is a rear elevation of the extruder of FIG. 4.

Turning to FIGS. 4 and 5, the extrusion die 30 is illustrated having the die body 31 having the channel 32 for the feeding of a fluid thermoplastic material with the auger 15 of FIGS. 1 and 2 therethrough out the extrusion channel 33 to produce a sheet or slab of thermoplastic extruded material from the mouth 34. The die has a plurality of gated plates 35 each connected to a threaded shaft 36 driven by a gate actuator motor 37 which can be a hydraulic or pneumatic motor but, as illustrated, is an electrical stepper motor having a control line 38 feeding to a remote controller 40 which can step the motor 37 in steps to move the plate 35 in and out to vary the thickness of the thermoplastic slab passing the channel portion 41. A plurality of any number of motors 37 can be seen in FIG. 5 driving a plurality of plates, each mounted abutting the next plate, and each plate controlled separately to thereby vary the plates 35 in the channel 41 in a wide variety of patterns for producing a slab out the output portion 34 having thicknesses which can vary across the width of the extruded slab. It will also be clear that the gates 35 can be manually controlled by individually threading each gate into and out to adjust the thickness of any portion of the extrusion die and can, alternatively, be controlled by a controller 40 which can be a computer program to vary the thickness of any portion of the extruded slab under remote control as desired.

A thermoplastic molding process is provided which includes selecting a thermoplastic extrusion die 16 or 30 for the extrusion of a thermoplastic slab, which extrusion die has an adjustable die gate members for varying the thickness of the extruded material in different parts of the extruded slab. The process includes adjusting the thermoplastic extrusion die for various thicknesses of the extruded material passing therethrough in different parts of the extruded slab and then heating a thermoplastic material to a fluid and extruding a slab of fluid thermoplastic material through the selected and adjusted thermoplastic extrusion die. The thermoplastic slab is then trimmed and directed onto a heated thermoplastic material into a thermoforming mold 19 or 23 and molded in a molding apparatus 13 to form a part with a variable thickness in the part.

It should be clear at this time that a thermoplastic molding process and apparatus have been provided which allow for the thermoforming of a part with a variable thickness with an extrusion die which can be continuously controlled to vary the thickness of different parts of the extruded slab being molded and that the molding is accomplished while the thermoplastic slab is still heated to utilize the heat energy from the extrusion process. However, it should also be clear that the present invention is not to be considered limited to the forms shown which are to be considered illustrative rather than restrictive.

I claim:

1. A thermoplastic molding system comprising:

a thermoplastic extrusion die for the extrusion of a thermoplastic slab, said extrusion die having a plurality of adjustable die gate members for varying the thickness of the extruded material in different parts of the extruded slab, said extrusion die plurality of die gate members having a plurality of extrusion die plates therein positioned adjacent to each other and separately adjustable to thereby vary the thickness across thermoplastic material being extruded from said die;

a trimmer for cutting said extruded thermoplastic slab from said thermoplastic extrusion die;

a plurality of thermoplastic molds, each mold being mounted on a movable platform for moving one mold at a time in a position to receive a thermoplastic slab being trimmed from said thermoplastic extrusion die, and each of said plurality of thermoplastic molds being movable on said movable platform between a mold loading position and a mold release position and said mold moveable platform being a rotating platform rotating each said thermoplastic mold mounted thereon to position one mold at a time in a position to receive the next trimmed thermoplastic slab from said extruding die, whereby a molded part can be formed with a variable thickness from a heated slab of thermoplastic material being fed still heated from an extrusion die.

2. A thermoplastic molding system in accordance with claim 1 in which said thermoplastic extrusion die has a plurality of gate plates each having a motor coupled thereto for moving each gate plate separately by remote control.

3. A thermoplastic molding system in accordance with claim 2 in which each said motor is an electric stepper motor.

* * * * *